Feb. 20, 1962   G. J. PERRY   3,021,681
COMBUSTION ENGINES
Filed Oct. 15, 1958

INVENTOR
GEORGE J. PERRY
BY *F. L. Sullivan*
ATTORNEY

United States Patent Office 3,021,681
Patented Feb. 20, 1962

3,021,681
COMBUSTION ENGINES
George J. Perry 24 Onandaga St., Yonkers, N.Y.
Filed Oct. 15, 1958, Ser. No. 767,423
4 Claims. (Cl. 62—7)

This invention is concerned with combustion engines, and particularly with an improvement in such engines whereby they may derive a relatively high octane component from their regular fuel and utilize this derivative for improved performance of the engine or in associated equipment such as automobile air conditioners.

The automobile industry has for a number of years devoted considerable effort to equipping its vehicles with sources of circulating warm or cold air which may be controlled to accommodate the comfort requirements of their passengers. The heating problem has been solved in a satisfactory and economical manner by circulating the hot water from the engine cooling system through a radiator and creating a current of warm air through the vehicle with a fan located proximate the radiator.

The cooling problem, however, has not been as easily solved. Air vents have been employed to create a draft of outside air through the moving vehicle, but this has been unsatisfactory because the air intake is subject to the dust and dirt of the travelled environment. Also, the air circulated is as hot as the outside temperature; and, its supply and circulation not only are limited when the vehicle is moving slowly, but cease entirely when it stops. All of these deficiencies are particularly, and accumulatively, objectionable during warm weather travel in traffic congested cities.

The problem can be solved by equiping automobiles with an air conditioner which circulates clean and cold air. Typical systems utilize the automobile engine to provide a mechanical take off for driving a complete air conditioning system comprising a pump which forces a refrigerant through a system of condensers and evaporators all of which are added as extra equipment to the vehicle. Such automobile air conditioners are relatively costly to manufacture and install and must be classified as luxury items.

Accordingly, a principal objective of the present invention is to provide a satisfactory automobile air conditioner which will be less costly than those hitherto available. Another objective is to utilize some of the regular components and features of air-breathing combustion engines to provide a high octane fluid useful as a refrigerant or as a high octane fuel. Other objectives include providing an improved refrigeration system and a more useful gasoline engine.

These and related objectives are accomplished in one embodiment of the invention by providing an automobile air conditioner and fuel booster in the following manner. A portion of the gasoline flow from the fuel pump to the carburetor is passed through a heated reservoir where it boils off vapors which are conducted to a condenser where they are cooled and liquified. The liquid is then pumped into an evaporator where, during the process of evaporation, it cools a current of air circulated by an electric fan. In addition, the high octane by-product of the process may be fed into the carburetor system to improve engine performance.

Other features, embodiments and modifications of the invention will be apparent from the following description and reference to the accompanying drawings, wherein.

Figure 1:
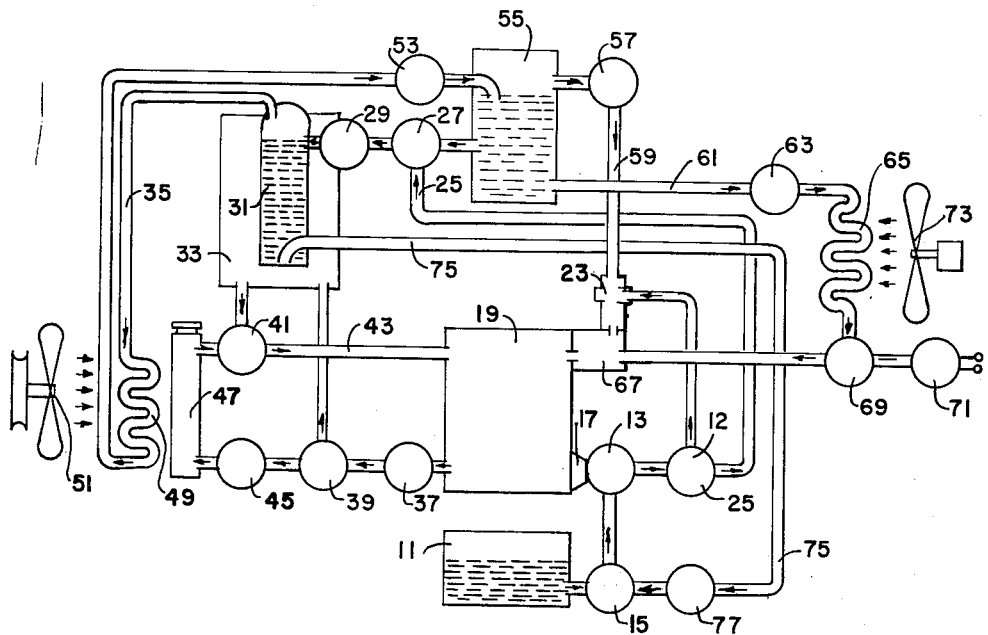
FIG. 1 is a diagrammatic representation of an air conditioning system embodying the invention.

The diagram of FIG. 1 shows how an air conditioning system embodying the invention may be incorporated into a standard automobile engine in a manner which derives from many of the regular component parts of the engine a secondary use for the air conditioning system.

A fuel reservoir 11 is provided in the form of a conventional gasoline tank. The fuel from this tank is drawn, by means of a pump 13, through a distribution valve 15. The pump 13 is operated by mechanical linkage 17 from a moving part of the engine mechanism 19. The fuel so pumped is forced through another distribution valve 12 to the carburetor 23, for conventional operation of the engine, and through a line 25, and control valves 27 and 29 to a boiler tank 31.

Boiler tank 31 is surrounded by a hot water jacket 33 whence is derived sufficient heat to vaporize the liquid in the tank and drive it under vapor pressure through line 35. The hot water supply for the jacket 33 is obtained from the regular cooling system of the engine 19. The water is circulated by pump 37 through distribution valve 39 into the jacket 33 and out of the jacket through distribution valve 41 and line 43 to the engine 19. A conventional thermostat control 45 is operable to cause the water to flow through the usual radiator 47 and back into the circulating system through valve 41 in a manner calculated to maintain a temperature adequate to cool the engine 19 and yet vaporize the fuel in tank 31.

The vapors under boiler pressure in pipe 35 pass through condenser coils 49, which may be located proximate the conventional radiator fan 51, and the condensed liquid is forced by a pump 53 into a reservoir 55. When the contents of tank 31 falls below a level controlled by valve 29, which may be a conventional float valve, additional fuel is admitted through valve 27 which maintains a desired level of liquid in reservoir 55. An escape for excess vapors in reservoir 55 is provided through a valve 57 and line 59 leading to the carburetor 23.

As a result of the vaporizing and condensing processes, the reservoir tank 55 contains a supply of high octane liquid suitable for refrigeration purposes. This liquid is drawn through pipeline 61, via valve 63, through evaporation coils 65 by the vacuum action of the intake manifold 67 which may be aided by a pump 69. This pump is driven by an electric motor 71 or through belt connections to some rotating part of the engine 19.

The liquid from reservoir 55 which is evaporated by evacuation of the coils 65 draws heat from the surrounding atmosphere and thereby cools a current of air driven across these coils by a fan 73. The coils 65 and fan 73 may be comprised by the water coil and fan system of a conventional automobile heater. For this purpose, the coil is disconnected from the water circulating system and connected between valves 63 and pump 69.

Figure 2:
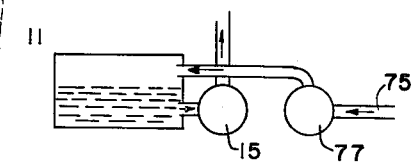
FIG. 2 is a diagram of an alternative fuel return for the system of FIG. 1; and, FIG. 3 is a diagram of a high octane fuel source embodying the invention.

In FIG. 1 the residual fuel in tank 31 resulting from the evaporation process is circulated through line 75 via valve 77 to distribution valve 15 whence it combines with fresh fuel from the tank 11 and is reintroduced through pump 13 to the carburetor 23 and tank 31. In FIG. 2 an alternative circulation system, more suitable for some applications, is shown. In this system the residual fuel coming through line 75 and valve 77 is fed back into the main tank 11 instead of being immediately recirculated through distribution valve 15.

The current of air created by the fan 73 and cooled by passage across the coils 65 may be distributed by a duct system or any suitable means to provide a circulation of cool air throughout the vehicle driven by the engine 19.

Figure 3:
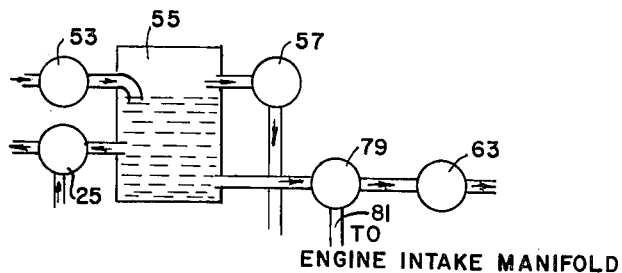

In FIG. 3 an additional use for the high octane liquid in the reservoir tank 55 is shown. For example, it may be distributed through a valve 79 and pipeline 81 directly to the intake manifold 67 in order to improve the performance of the engine 19.

The invention has been described with reference to an automobile air conditioning system and improved engine performance. It is understood, however, that it is not limited to the specific embodiments shown by way of example, but embraces the full scope of the following claims.

What is claimed is:

1. A method of cooling the interior of a vehicle propelled by a combustion engine having a cooling system which circulates a coolant between the engine which heats it and a radiator which comprises the steps of distilling some of the more volatile constituents of the fuel by means of said heated coolant, condensing the resulting vapor to obtain a volatile refrigerant, and evaporating said refrigerant in heat transfer relationship with a circulating body of air thereby cooling said air.

2. For a vehicle propelled by a combustion engine having a fuel reservoir and a cooling system including a circulating coolant, a vehicle air conditioning system which comprises: a boiler tank including a reservoir portion and a heat transfer jacket portion; means for transferring fuel from said fuel reservoir to said boiler tank reservoir portion; means for circulating said coolant from said cooling system to said heat transfer jacket; means for maintaining said circulating coolant within a temperature range which will cool said enigne and yet vaporize the more volatile constituents of said fuel; means for condensing said vaporized fuel to obtain a volatile refrigerant; means for evaporating said refrigerant; and, means for circulating a current of air for air conditioning purposes into heat transfer relationship with said means for evaporating thereby cooling said air.

3. For a vehicle operated by a combustion engine, means for cooling the interior of said vehicle including, the combination of: a fuel reservoir tank; a fuel pump; a carburetor; a boiler tank; means for pumping fuel from said tank to said carburetor and said boiler; a hot water jacket in heat transfer relationship with said boiler; means for circulating a coolant to said engine; means for circulating said same coolant to said jacket; means for maintaining said coolant at a temperature adequate to cool said engine and yet vaporize the more volatile constituents of said fuel; means for condensing said vaporized fuel to a liquid; means for evaporating said condensed liquid; and, means for circulating a current of air between heat transfer relationship with said evaporating means which cools said air and said interior.

4. In a vehicle propelled by a combustion engine, a combination power plant and air conditioning system comprising: a fuel tank; a carburetor; a boiler having a reservoir compartment and a heating compartment; a pump arranged to transfer fuel from said tank to said carburetor and said reservoir compartment; an engine cooling system including a coolant, a radiator, and a radiator fan; thermostat controlled means for circulating said coolant through said engine, said heating compartment, and said radiator at a temperature low enough to cool said engine and high enough to vaporize the more volatile constituents of said fuel; a condenser coil proximate said radiator fan and arranged to condense said vaporized fuel to a liquid; a storage reservoir, an evaporator connected to said condensed liquid storage reservoir; and, a fan arranged to circulate air across said evaporator whereby said air will lose heat and become cool when said condensed liquid is evaporated in said evaporator.

References Cited in the file of this patent

UNITED STATES PATENTS

| | | |
|---|---|---|
| 1,935,749 | Schlumbohm | Nov. 21, 1933 |
| 2,041,585 | Backstrom | May 19, 1936 |
| 2,080,420 | Haverkost et al. | May 18, 1937 |
| 2,120,166 | Tonkin | June 7, 1938 |
| 2,136,527 | Stelzer | Nov. 15, 1938 |
| 2,183,452 | Gibbs et al. | Dec. 12, 1939 |
| 2,327,451 | Perrine | Aug. 24, 1943 |
| 2,384,472 | Landers | Sept. 11, 1945 |
| 2,565,767 | Gaskell | Aug. 28, 1951 |
| 2,701,133 | Mendez | Feb. 1, 1955 |